Dec. 14, 1954

C. C. CASE 2,696,675

GAUGE WITH ADJUSTABLE CRADLE

Filed Oct. 17, 1951

INVENTOR.
Calvin C. Case
BY
Bohleber, Jacett + Montstream
ATTORNEYS

United States Patent Office 2,696,675
Patented Dec. 14, 1954

2,696,675

GAUGE WITH ADJUSTABLE CRADLE

Calvin C. Case, Simsbury, Conn., assignor, by mesne assignments, to The Johnson Gage Development Company, a corporation of Connecticut Application October 17, 1951, Serial No. 251,669

19 Claims. (Cl. 33—178)

The invention relates to a gage having an adjustable cradle. The gage is of the type which utilizes a pivoted cradle to open and close the gage which cradle carries two gaging members spaced circumferentially with respect to the test part. The gaging members preferably are gaging rollers. With a gage having three gaging rollers it is desirable for maximum utility of the gage to test cylindrical parts, fluted taps, etc. that the gaging rollers contact the test piece 120° apart around the periphery thereof. For a gage having four gaging rollers, two on each of two cradles, they should be spaced 90° apart. The angular displacement for an integral cradle with one diameter of gaging roller would be suitable for one diameter of test part only. The adjustable cradle enables the spacing of the rollers to be adjusted so that they will engage the test part at points 120° apart on the periphery thereof for different diameters of test parts.

It is an object of the invention to construct a gage of the type utilizing spaced gaging rollers in which two of the rollers are carried by a pivotal cradle for opening and closing the gage which cradle is adjustable for varying the spacing between the gaging members or rollers carried thereby.

Another object of the invention is to construct a gage as described above in which a setting templet or block is provided for accurately spacing the rollers of the cradle.

A further object is to construct a gage as above as well as a templet which accurately spaces apart the plurality of gage rollers.

Another object is to construct a gage of the comparator type with a templet which accurately spaces the rollers with respect to each other, locates the stop position of the cradle and the indicator setting.

A still further object is to construct a setting templet.

Other objects of the invention will be more apparent from the following description taken in connection with the accompanying drawings in which:

Figure 1 is a plan view of the gage in gaging position;

Figure 2 is a cross section through a gaging roller showing the mounting therefor;

Figure 3 is a plan view of one of the arms of the adjustable cradle;

Figure 4 is a side view of the arm of Figure 3;

Figure 5 is a front view of the other arm of the adjustable cradle;

Figure 6 is a side view of the arm of Figure 5;

Figure 7 is a perspective view of a two-hole setting block or templet;

Figure 8 is a perspective view of a three-hole setting block or templet; and

Figure 9 is a view of a spacing washer.

The gage particularly illustrated is a comparator type of gage in that one gage member or roller is mounted for movement towards and away from the pair of gage members or rollers and the variation of the test part T from a perfect piece is indicated on the indicator 10. The gage may be of the snap type such as shown in the Johnson Patent 2,433,516 in which the pivot for the single gage roller is fixed and the acceptability of the test part as not being oversized is determined by the test part passing through gaging position G. Such a snap type gage is used with not-go gaging elements to test for undersize. The gage members are preferably gage rollers.

The gage includes a frame 11 of any suitable kind which preferably has a pair of spaced posts 12 and 13. With a comparator type of gage, the gaging means is mounted upon a carrier which permits the same to move towards and away from the cooperating gaging means to be described. In the construction shown a pivoted carrier or arm 17 is shown which is secured to the frame 11 by a pivot 18 so that through the range of movement thereof, it moves substantially in a straight line towards and away from the cooperating gaging means. Preferably the gaging means carried by the carrier arm is a single gaging roller 16. This gaging roller 16 may be adjustable on the pivoted carrier 17 in any fashion such as the roller being carried on a slider 19 which slides in a groove 20 on the carrier arm and is secured in position by a lock screw 21. A spring 22 resiliently projects the pivoted carrier 17, and hence the gage roller 16, towards the cooperating gaging rollers.

The cooperating gaging means includes a pair of spaced gaging rollers 25 and 26 carried by an adjustable cradle which is pivotally mounted upon the post 13 by a pivot 27. The adjustable cradle is shown in Figures 3 through 6 and includes an arm member 29 having a bearing 30 to receive the pivot 27. An arm 31 projects from the arm member which arm carries the gaging roller 25. The arm member 29 may have a lateral extension 32 to provide a long bearing for the pivot 27.

The adjustable cradle includes a second arm member 35 which has an arm 36 projecting therefrom which arm carries the gage roller 26. The arm member may be mounted in any suitable manner for adjustment with respect to the arm member 29; preferably however the member has a bearing 37 which is received by the extension 32 of the arm member 29 and is turnable thereupon.

Means which may take many forms are provided for adjustably securing the two arm members together to form the adjustable cradle. The means particularly illustrated are a pair of arcuate slots 39 through which pass clamping screws 40 which are threaded into the holes 41 on the arm member 29. The arcuate slots permit one arm member to be adjusted with respect to the other so that the spacing between the gaging rollers can be adjusted for different sizes of test parts.

The adjustable cradle is turnably retained upon the pivot 27 by any means, that shown including a headed screw 42 carried by the end of the pivot 27.

Each gage member or roller may be fixed but preferably it is a gaging roller mounted for rotation upon a stud. The gage roller mounting is shown in detail in Figure 2 and includes a stud 44 having a threaded hole 45 therethrough, one end of which receives a locking screw 46 and the other end receives a large headed screw 47, the head of which forms the abutment of shoulder which retains the gaging roller on the stud. The stud therefore overhangs the arm so that it has a free end or overhanging end. From this end the gaging roller stud is of one diameter so that by removing the screw 47 the gaging roller may be removed and replaced and also a setting templet may be inserted thereover as will appear more fully hereinafter. A washer 48 shown in Figure 9 may be used to bring the gaging stud carried by the arm 31 into the same planar position as, or cooperating gaging position with the stud carried by the arm 36. This stud preferably is that disclosed in the Johnson application Ser. No. 42,881.

The gaging roller may have a plane cylindrical surface for gaging plane cylindrical surfaces or may be conical for conical surfaces. For screw threads, one V gaging roller and two single ribbed or ridged cone rollers is correct for gaging the pitch diameter of a test screw thread or may have a larger number of ridges for gaging the over-all assemble-ability of the thread of a test part. The gage rollers may be fixed, however, the rollers if pivotally mounted are subject to far less wear since a greater surface of contact is provided and the rollers roll with the test part rather than slide therewith.

In setting the adjustable cradle the locking screws 40 are loosened and adjusted to proper position, the adjustment being measured across the studs with a micrometer after which the locking screws are tightened to hold the arms 31 and 36 and hence the studs 44 and the gaging rollers in adjusted spaced relation. The gaging rollers are then mounted upon the gage studs and turnably retained thereon by the head of the screws 47. A simpler method and means, which is made possible because the gaging roller studs having a uniform or single diameter at the free or overhanging end thereof, is by use of a setting block or templet. One such templet 51 is shown in Figure 7 which has a pair of spaced holes 52 which are accurately spaced the proper distance so that when the rollers are mounted thereon, they will engage the periphery of a test part at or substantially at points 120° apart. These holes are accurately ground to size to snugly receive the gaging studs 44 carried by each arm 31 and 36. For practical purposes, play or clearance between the diameter of the hole and the stud of two thousandths of an inch is desirable. The holes may be countersunk so as to more easily slip the studs into the holes. With the setting templet on the studs and holding them in accurately spaced relation, the screws 40 are tightened to clamp the arms of the adjustable cradle together in set position. The setting templet is then removed and the gaging rollers are mounted upon each stud.

A better arrangement and method utilizes a setting templet or block 53 shown in Figure 8 having three spaced holes 54, 55, 56 one for each gaging element which may be a stud or roller. These holes are spaced equal distances from each other so that accurate triangulation is secured. The three holes 54, 55 and 56 are ground to the diameter of the gaging element to be received thereby with about .002 of an inch clearance so that the gaging element will be received without looseness or play. One hole such as hole 54 will receive the gage stud or roller carried by the arm 31, a second hole 55 will receive the gage stud or roller carried by the arm 36, and a third hole 56 will receive the stud for or the roller 16. With this templet in position on the studs or rollers the locking screws 40 and 21 are tightened in set position so that all three studs and hence the rollers are properly spaced with respect to each other and accurate triangulation thereof is secured.

It is to be noted that a two-hole templet for three different sizes may also be provided by the templet 53 in which the spacing between holes 54 and 55 is one dimension, the spacing between holes 55 and 56 is a second dimension and the spacing between holes 56 and 54 is a third dimension in which case this templet with three holes provides three settings for two rollers or studs whereas three individual templets such as that of Figure 7 would require six holes.

It is easier to use the setting templet if it is stepped as shown, so that the hole 54 may first be started on its stud, then the hole 55 is started on its stud and the third hole is started on its stud. With snug fitting holes this progressive mounting makes it easier to mount the templet on three studs. The templet of Figure 7 may be similarly stepped. It is clear too that the templet may be slipped on the two studs of the adjustable cradle and the setting screws so tightened after which the stud for gaging roller 16 is slipped into its templet hole. With the three hole templet, not only are the studs properly spaced but for a comparator gage as particularly shown, the stop screw 60 is easily and quickly adjusted to its proper position and assures correct setting and spacing of the three gaging rolls so that the triangulation is correct to obtain a 1 to 1 reading or amplification on the dial indicator.

The setting templet for the gage studs is the preferred manner of setting the gage with proper spacing between the studs and hence proper spacng between gaging rollers. It is clear that the templet may have holes to receive the gage rollers themselves; however, this is not as desirable if the gage rollers are worn since an accurate setting may not be secured unless the setting is done with new rollers or setting rollers which are removed and the gaging rollers then mounted on the studs. The stud and the gaging roller constitute a gaging element for setting the adjustable cradle and the gaging means which cooperate therewith. Likewise the adjustable cradle may be set so as to gage five fluted taps in which case the angular displacement of the studs or gaging rollers on the cradle with respect to the test piece would be 72°. Such a setting merely requires a templet having the holes properly spaced for this kind of test part.

One templet is used for each size of test part and four adjustable cradles are found desirable to cover a range of test part from .099 to 5" in diameter. The gaging rollers should be of a proper diameter for each test part so as to engage the test part at or approximately at 120° apart on the periphery of the test part.

For a comparator type of gage such as that illustrated in which the gage roller 16 is movable towards and away from the cooperating gaging rollers 25, 26, a stop means of any suitable kind is used to limit the pivotal movement of the adjustable cradle to gaging position as shown with the axis of the test part T at the point G. The point G is on a line between the center of the pivot 27 and the center of the gaging roller 16. The stop means shown is a shoulder 59 on the cradle and an adjusting screw 60 threaded in a projection 61 carried by the frame 11.

In using the gage, the pivotal cradle is swung upwardly by the handle 62 to open the gage, the test part is inserted, after which the cradle is pivoted down by the handle or by a spring (not shown) to gaging position with the pivotal cradle against the stop screw 60 and a reading of the indicator 10 is made. The reading determines whether or not the test part is within the allowable tolerances and also the amount of deviation from a master or perfect part. The test part is then removed by upward movement of the test part which swings the cradle to open position or by swinging the cradle to up or open position.

The cooperating gaging means in the construction particularly shown includes the gaging rollers 25 and 26 operating as a unit and the gaging roller 16. It is to be understood that the gaging means 16 may be a cradle carrying unit like that for gaging rollers 25 and 26. In such case the setting templet would have four holes, that is one for each roller stud. It is understood too that each gaging means cooperates with the other gaging means to gage a test part irrespective of whether it constitutes a single gaging roller or a pair of gaging rollers.

This invention is presented to fill a need for improvements in a Gage With Adjustable Cradle. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gage comprising a frame means, a pivot carried by the frame means; an adjustable gaging roller cradle carried by the pivot and freely pivotal thereon for a substantial angle, including a first arm, a gaging element carried by the first arm spaced from the pivot, a second arm pivotally mounted with respect to the first arm and the pivotal axis being the same as the cradle pivot axis, a gaging element carried by the second arm spaced from the pivot and from the gaging element carried by the first arm, the gaging elements being parallel with each other and spaced equally from the cradle pivot axis, and means adjustably securing the first arm and second arm together; and a cooperating gaging means carried by the frame and having at least one gaging element spaced from the path of movement of the gaging elements carried by the adjustable cradle so that a test part may pass therebetween at least to gaging position therebetween.

2. A gage as in claim 1 including a setting template having at least two accurately spaced holes and of accurate diameter to receive the gaging elements.

3. A gage as in claim 1 in which the cooperating gaging means carries one gaging element.

4. A gage as in claim 3 including a setting templet having three accurately spaced holes and of accurate diameter to receive the gaging elements.

5. A gage comprising a frame means, a pivot carried by the frame means; an adjustable gaging roller cradle carried by the pivot and freely pivotal thereon for a substantial angle including a first arm, a first gaging roller carried by the first arm spaced from the pivot, a second arm pivotally mounted with respect to the first arm and the pivotal axis being the same as the cradle pivot axis, a second gaging roller carried by the second arm spaced from the pivot and from the first gaging roller, the gaging rollers being parallel with each other and spaced equally from the cradle pivot axis, and means adjustably securing the first arm and second arm together; and cooperating gaging means carried by the frame means spaced from the path of movement of the gaging rollers on the adjustable cradle whereby the test part passes between the gaging means at least to gaging position.

6. A gage as in claim 5 in which the cooperating gaging means includes a second pivot carried by the frame and a single gaging roller carried by the second pivot.

7. A gage as in claim 5 including a setting templet having at least two holes accurate as to spacing therebetween and as to size to receive the gaging rollers.

8. A gage as in claim 5 including a stud projecting laterally from each arm and having an overhanging end, each stud being spaced from the pivot and having a cylindrical surface of one diameter from the overhanging end, and the gaging rollers being mounted on the studs.

9. A gage as in claim 8 including a setting templet having at least one pair of accurately spaced holes and of accurate diameter to receive and set the studs of the adjustable cradle.

10. A gage comprising a frame means, a first pivot carried by the frame means, a second pivot carried by the frame means spaced from the first pivot, a carrier arm pivotally mounted upon the first pivot, a gaging roller stud carried by the arm spaced from the first and second pivots; and an adjustable roller cradle carried by the second pivot including a first arm, a gaging roller stud carried by the first arm spaced from the second pivot, a second arm pivotally mounted with respect to the first arm and the pivotal axis being the same as that of the second pivot, a gaging roller stud carried by the second arm spaced from the second pivot a distance equal to the spacing of the roller stud of the first arm from the pivot, the gaging roller studs being spaced from and parallel with each other, and means adjustably securing the first arm and second arm together.

11. A gage as in claim 10 in which each of the gaging roller studs for the first and second arms projects laterally from its arm in parallel relation with an overhanging end and being cylindrical of one diameter from the overhanging end.

12. A gage as in claim 11 including a setting templet having at least one pair of spaced holes therein in parallel relation to receive the cylindrical end of the gaging roller studs, for the adjustable cradle to accurately space the same from each other.

13. A gage as in claim 12 in which one face of the setting templet is in a different plane adjacent each hole.

14. A gage as in claim 10 in which each of the three gaging roller studs projects laterally from its arm with an overhanging end and being cylindrical of one diameter from the overhanging end.

15. A gage as in claim 14 including a setting templet having at least three spaced holes therein in parallel relation to receive the cylindrical end of the gaging roller stud on the three arms to accurately space the same from each other.

16. A gage as in claim 14 including a setting templet having three holes in parallel relation and equally spaced apart.

17. A gage as in claim 14 including a setting templet having three holes in parallel relation and unequally spaced apart.

18. A gage as in claim 16 in which the face of the templet adjacent each hole is in a different plane.

19. A gage as in claim 10 including gaging rollers carried by each stud, and means at the overhanging end of the studs to retain the gaging rollers thereupon.

References Cited in the file of this patent

UNITED STATES PATENTS

| Number | Name | Date |
| --- | --- | --- |
| 730,178 | Vaughan | June 2, 1903 |
| 1,423,339 | Ledell | July 18, 1922 |
| 2,322,305 | McGuire | June 22, 1943 |
| 2,437,160 | Johnson | Mar. 2, 1948 |
| 2,451,123 | Schultz | Oct. 12, 1948 |
| 2,548,197 | Conner | Apr. 10, 1951 |
| 2,572,013 | Cushman | Oct. 23, 1951 |
| 2,616,185 | White | Nov. 4, 1952 |

FOREIGN PATENTS

| Number | Country | Date |
| --- | --- | --- |
| 567,207 | Great Britain | Feb. 2, 1945 |